United States Patent
Takizawa et al.

(10) Patent No.: US 11,014,092 B2
(45) Date of Patent: May 25, 2021

(54) INCINERATED-ASH TREATMENT DEVICE AND TREATMENT METHOD

(71) Applicant: Taiheiyo Cement Corporation, Tokyo (JP)

(72) Inventors: Kou Takizawa, Chiba (JP); Tomonori Takemoto, Chiba (JP); Takashi Hanada, Chiba (JP); Yasuyuki Ishida, Chiba (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 164 days.

(21) Appl. No.: 16/333,753

(22) PCT Filed: Aug. 24, 2017

(86) PCT No.: PCT/JP2017/030284
§ 371 (c)(1),
(2) Date: Mar. 15, 2019

(87) PCT Pub. No.: WO2018/061545
PCT Pub. Date: Apr. 5, 2018

(65) Prior Publication Data
US 2020/0009574 A1    Jan. 9, 2020

(30) Foreign Application Priority Data

Sep. 28, 2016 (JP) .............................. JP2016-188982
Mar. 9, 2017 (JP) .............................. JP2017-044525

(51) Int. Cl.
B02C 23/14    (2006.01)
B02C 23/10    (2006.01)
(Continued)

(52) U.S. Cl.
CPC .............. B02C 23/14 (2013.01); B02C 23/10 (2013.01); B03C 1/23 (2013.01); B07B 7/01 (2013.01);
(Continued)

(58) Field of Classification Search
CPC ........... B02C 23/10; B02C 23/14; B07B 7/01; C04B 7/26; C04B 7/28; C04B 7/48
(Continued)

(56) References Cited

U.S. PATENT DOCUMENTS

2011/0082265 A1* 4/2011 Sugamata ........... C04B 40/0039
525/451
2011/0147501 A1* 6/2011 Valerio .................. B03B 9/061
241/24.25
(Continued)

FOREIGN PATENT DOCUMENTS

JP      59123590 U      8/1984
JP      2003320311 A    11/2003
(Continued)

OTHER PUBLICATIONS

International Search Report for PCT/JP2017/030284; dated Oct. 3, 2017.

*Primary Examiner* — Terrell H Matthews
(74) *Attorney, Agent, or Firm* — Stetina Brunda Garred and Brucker; Mark B. Garred

(57) ABSTRACT

An apparatus and method to efficiently recover noble metals such as gold, silver and copper and aluminum from incineration ash, and effectively use ash after recovering the noble metals and others. An incineration ash treatment apparatus 1 including: a crusher for crushing an incineration ash A1 to be less or equal to 5 mm in maximum particle diameter, or/and a classifier for classifying an incineration ash to obtain an incineration ash whose maximum particle
(Continued)

diameter is less or equal to 5 mm; an eddy current separator 8 for separating an incineration ash whose maximum particle diameter is less or equal to 5 mm discharged from the crusher or/and the classifier into a conductor E and a nonconductor I; a specific gravity separator for separating a conductor discharged from the eddy current separator 8 into a high gravity material H2 and a low gravity material L2. The specific gravity separator can be an air table 10. A classifier for classifying a crushed material C, classifying point of which is 5 mm or less, can be mounted, and fine particles P whose particle diameters are 5 mm or less discharged from the classifier can be fed to the eddy current separator 8. Rotation speed of a drum of the eddy current separator 8 can be 4000 rpm or more.

9 Claims, 5 Drawing Sheets

(51) Int. Cl.
*B03C 1/23* (2006.01)
*B07B 7/01* (2006.01)
*B07B 9/02* (2006.01)
*C04B 7/26* (2006.01)
*C04B 7/28* (2006.01)
*C04B 7/42* (2006.01)

(52) U.S. Cl.
CPC ............... *B07B 9/02* (2013.01); *C04B 7/26* (2013.01); *C04B 7/28* (2013.01); *C04B 7/42* (2013.01)

(58) Field of Classification Search
USPC ........................................................ 209/12.1
See application file for complete search history.

(56) References Cited

U.S. PATENT DOCUMENTS

| | | | |
|---|---|---|---|
| 2013/0181075 A1* | 7/2013 | Pickens | B02C 23/14 241/14 |
| 2016/0068758 A1* | 3/2016 | Linck | C10G 47/02 585/242 |
| 2017/0209870 A1* | 7/2017 | Valerio | B03B 5/623 |

FOREIGN PATENT DOCUMENTS

| | | | |
|---|---|---|---|
| JP | 2006136772 A | * | 6/2006 |
| JP | 2013685 A | | 1/2013 |
| JP | 2016089196 A | | 5/2016 |

\* cited by examiner

【Fig. 1】
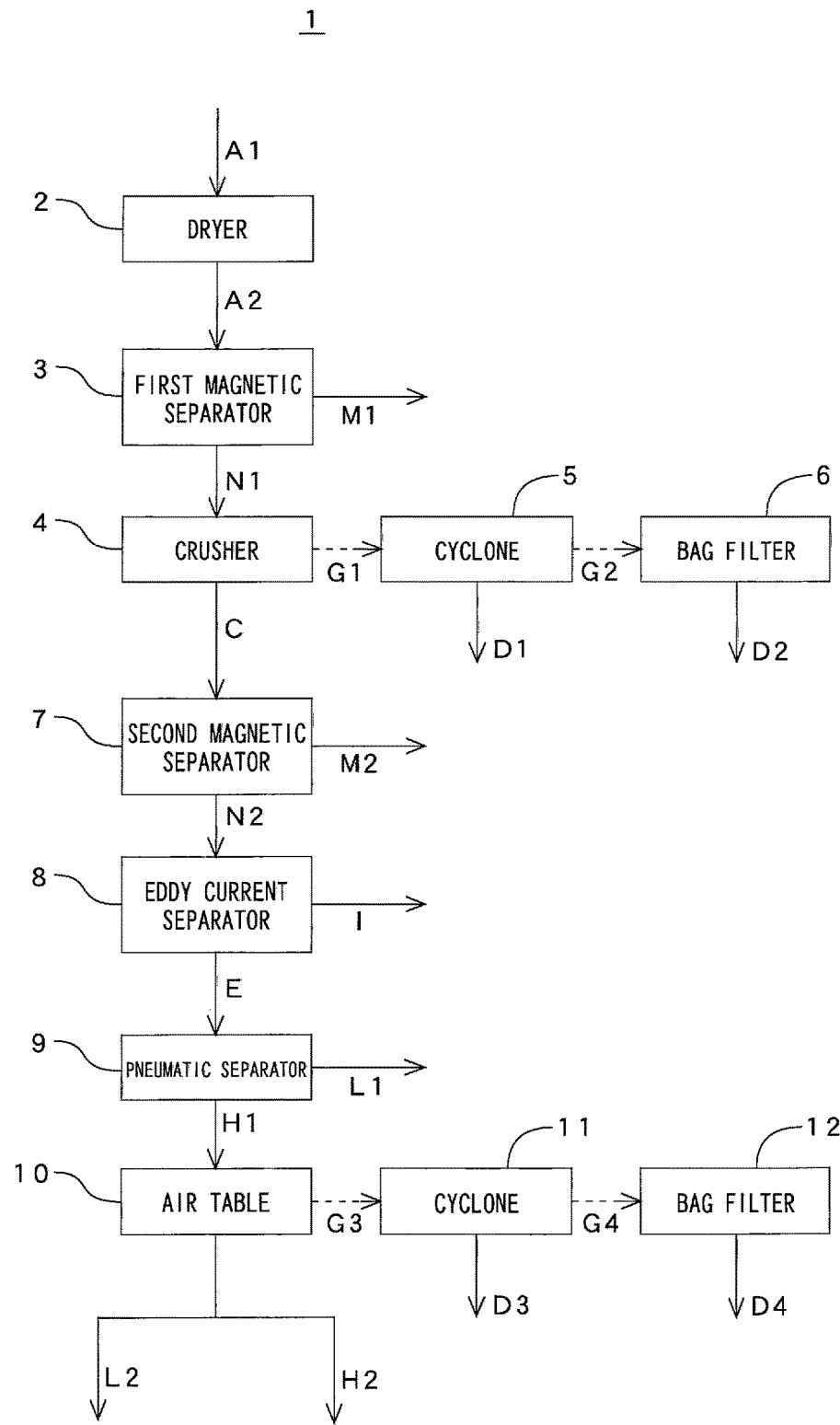

[Fig. 2]
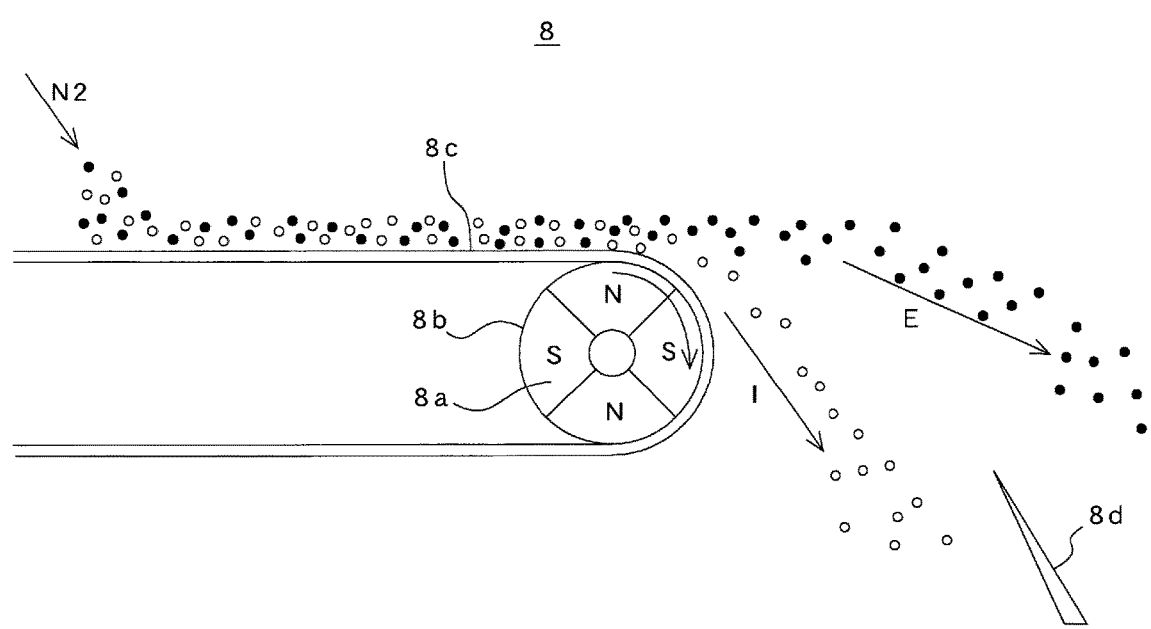

[Fig. 3]
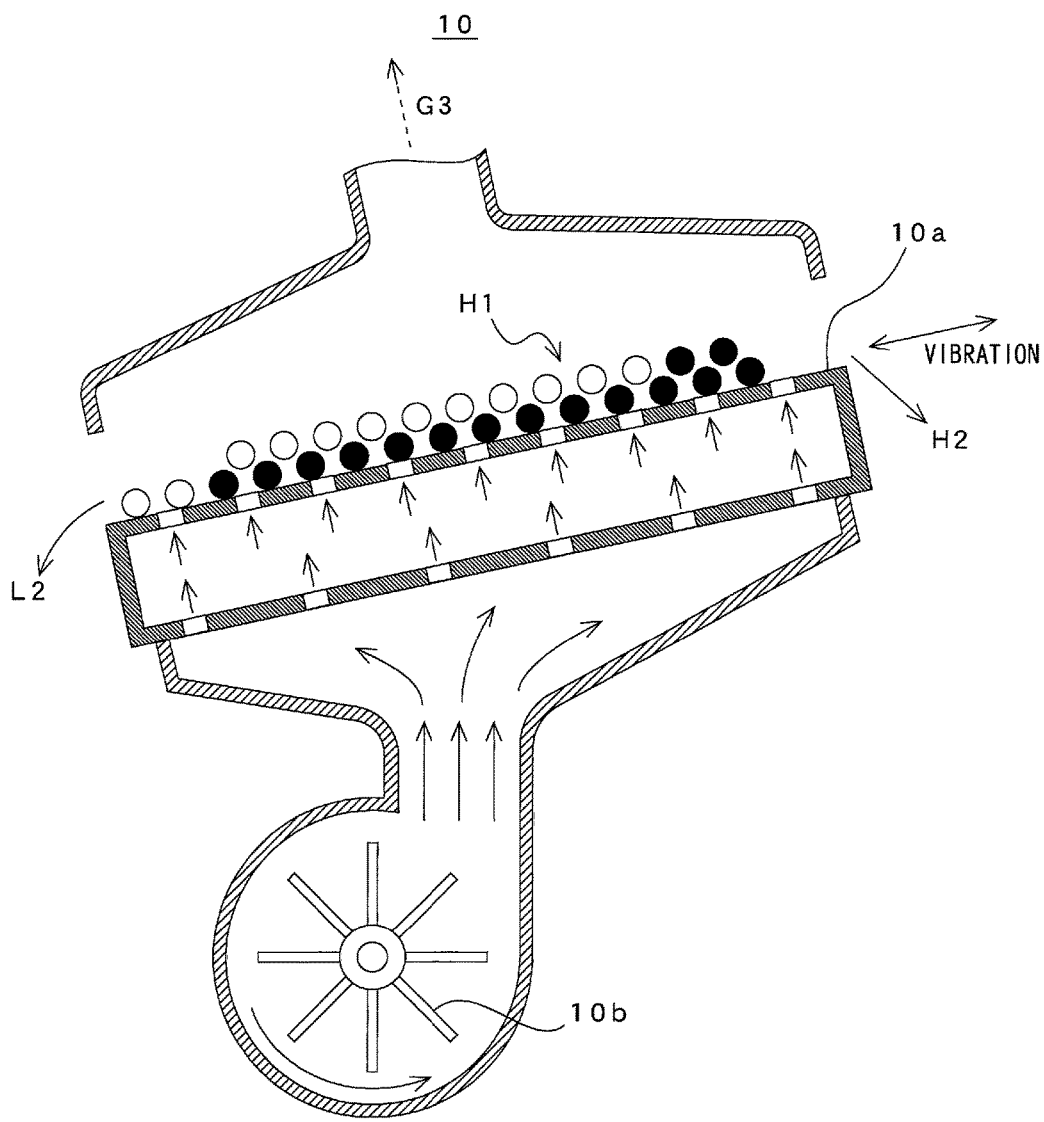

[Fig. 4]
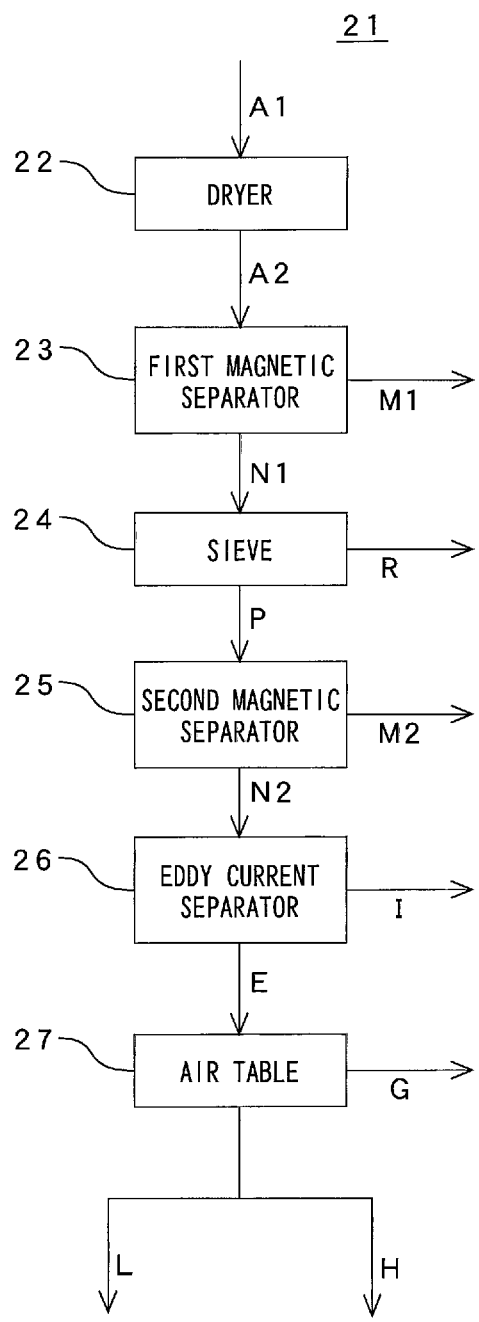

[Fig. 5]
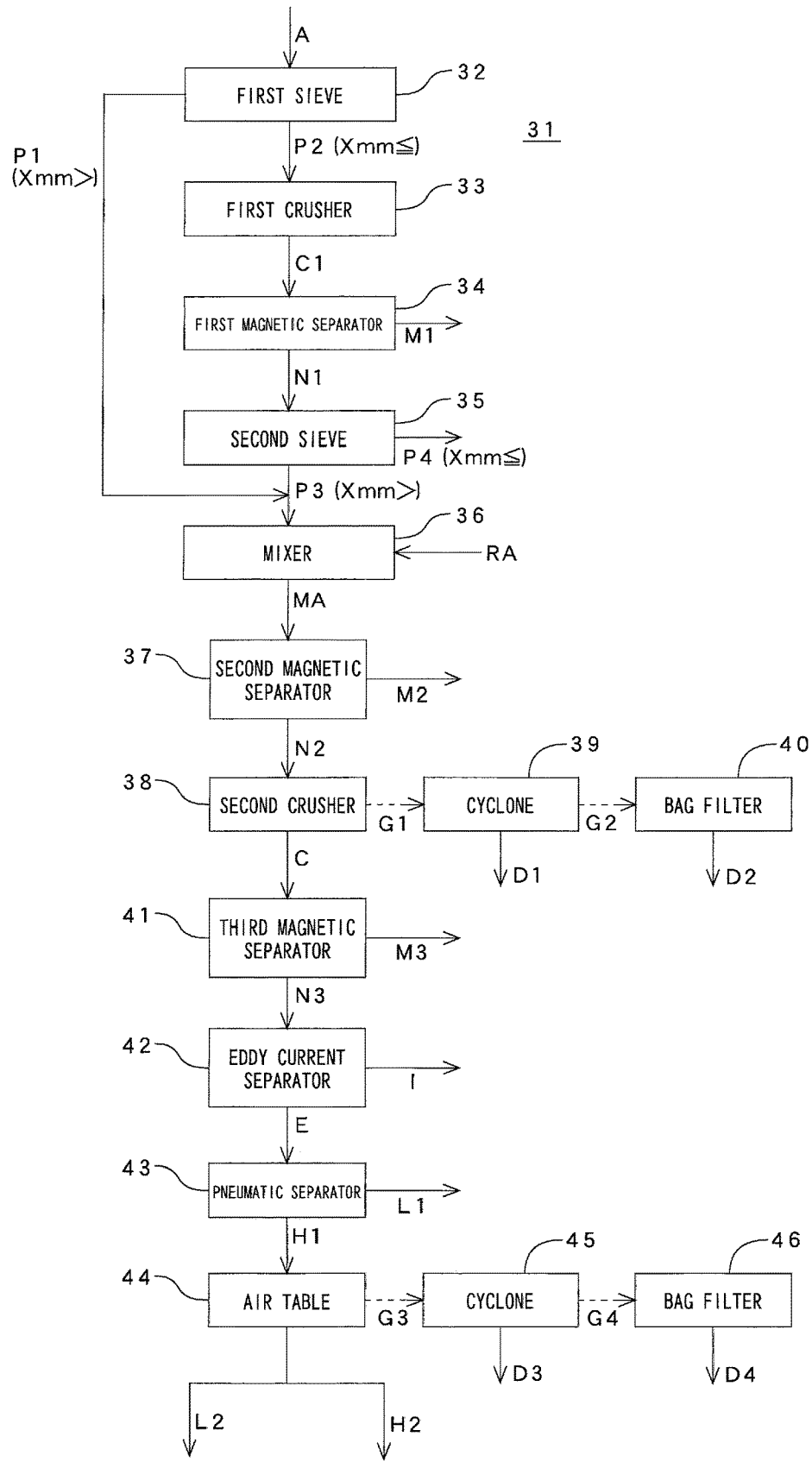

INCINERATED-ASH TREATMENT DEVICE AND TREATMENT METHOD

CROSS-REFERENCE TO RELATED APPLICATIONS

The present application claims priority to International Application No. PCT/JP2017/030284 filed Aug. 24, 2017, Japanese Patent Application No. 2016-188982 filed Sep. 28, 2016, and Japanese Patent Application No. 2017-044525 filed Mar. 9, 2017, the disclosures of which are incorporated herein by reference.

STATEMENT RE: FEDERALLY SPONSORED RESEARCH/DEVELOPMENT

Not Applicable

BACKGROUND

1. Technical Field

The present invention relates to an apparatus and a method for recovering noble metals from incineration ash, and effectively utilizing ash after recovering the noble metals.

2. Description of the Related Art

Waste material such as municipal waste has been incinerated, and incineration ash generated by the incineration has been subjected to landfill disposals. But, in recent years, taking in consideration that landfill sites could have been run out, it has been tried to effectively utilize the incineration ash. Particularly, it has been actively tried to recover metals from the incineration ash, and effectively utilize ash after the recovery.

For example, in the patent document 1 is described that an incineration ash is crushed by a dry type ball mill and is classified by a sieve, metals are recovered on coarse particle side obtained by the classification, and fine particles obtained by removing metals from ash to a certain extent are effectively used as a cement raw material.

Patent document 1: Japanese Patent Publication No. 2009-56362 gazette.

However, in incineration ash are included noble metals such as gold, silver and copper other than general metals, so that in order to use incineration ash more effectively, it is desired that ash is utilized after efficiently recovering the noble metals from incineration ash.

Then, the present invention has been made in consideration of the above problems in the conventional technique, and the object of the present invention is to efficiently recover noble metals from incineration ash and effectively use ash after the recovery of the noble metals.

BRIEF SUMMARY

In order to attain the above object, the present invention relates to an incineration ash treatment apparatus, and the apparatus is characterized by including: a crusher for crushing an incineration ash to be less or equal to 5 mm in maximum particle diameter, or/and a classifier for classifying an incineration ash to obtain an incineration ash whose maximum particle diameter is less or equal to 5 mm; an eddy current separator for separating an incineration ash whose maximum particle diameter is less or equal to 5 mm discharged from the crusher or/and the classifier into a conductor and a nonconductor; a specific gravity separator for separating a conductor discharged from the eddy current separator into a high gravity material and a low gravity material.

With the present invention, after maximum particle diameter of an incineration ash is adjusted to be less or equal to 5 mm, noble metals and metal aluminum can efficiently be recovered on the conductor side by the eddy current separator, and further sorting the noble metals and the metal aluminum with each other by the specific gravity separator allows the noble metals and the metal aluminum to be recovered efficiently and separately from an incineration ash. Remaining ash can effectively be used as a cement raw material or the like. Particularly, aluminum content of the ash is reduced as compared to the incineration ash before sorting treatment, so that amount of the ash used for manufacturing one ton of cement can be increased.

In addition, in the above incineration ash treatment apparatus, the specific gravity separator can be an air table, and rotation speed of a drum of the eddy current separator can be more or equal to 4000 rpm.

Further, the above incineration ash treatment apparatus can further include a mixer for mixing a reformer for preventing the pelletization into the incineration ash, and mixing the reformer into incineration ash can prevent pelletization of the incineration ash.

In addition, the above incineration ash treatment apparatus can further include a pneumatic separator for separating a conductor discharged from the eddy current separator by wind force into a heavy material and a light material. With the pneumatic separator, noble metals can be recovered more effectively.

Further, the present invention relates to an incineration ash treatment method, and the method is characterized by including the steps of crushing an incineration ash to be less or equal to 5 mm in maximum particle diameter or/and classifying an incineration ash to obtain an incineration ash whose maximum particle diameter is less or equal to 5 mm; sorting an incineration ash whose maximum particle diameter is less or equal to 5 mm obtained by the crashing or/and classification by eddy current sorting into a conductor and a nonconductor; and sorting the conductor obtained by the eddy current sorting by specific gravity sorting into a high gravity material and a low gravity material.

With the present invention, noble metals and metal aluminum can be recovered efficiently and separately from incineration ash.

In addition, in the incineration ash treatment method, the nonconductor can be used as a cement raw material.

Further, the above incineration ash treatment method can include the step of mixing a reformer for preventing pelletization into the incineration ash before crushing or/and classifying the incineration ash. With this, pelletization of incineration ash can be prevented.

In addition, the above incineration ash treatment method can include the step of sorting a conductor obtained by the eddy current sorting by wind sorting into a heavy material and a light material before the specific gravity sorting. With this, noble metals can be recovered more efficiently.

Further, in the above incineration ash treatment method, the reformer can be at least one selected from incineration fly ash of municipal waste, coal fly ash, limestone powder and ground sand. Using these components as the reformer can use a mixture of incineration ash and those as a cement raw material after noble metals are recovered.

In addition, in the above incineration ash treatment method, the reformer can be the light material sorted by the wind sorting. Using the light material whose coarse particle and water contents are low provides good pelletization proof effect.

In addition, in the above incineration ash treatment method, amount of the reformer added to the incineration ash can be more or equal to 15 pts.mass and less or equal to 50 pts.mass to 100 pts.mass of the incineration ash. With this, pelletization of incineration ash can be prevented more effectively.

In addition, in the above incineration ash treatment method, particle diameter of the reformer can be less or equal to 0.1 mm. With this, pelletization of incineration ash can effectively be prevented.

As described above, with the present invention, it is possible to efficiently recover noble metals and others from incineration ash and effectively use remaining ash.

BRIEF DESCRIPTION OF THE DRAWINGS

FIG. 1 is a whole block diagram showing an incineration ash treatment apparatus according to the first embodiment of the present invention.

FIG. 2 is a schematic view showing an eddy current separator for the treatment apparatus shown in FIG. 1.

FIG. 3 is a schematic view showing an air table for the treatment apparatus shown in FIG. 1.

FIG. 4 is a whole block diagram showing an apparatus for an exemplary test for the incineration ash treatment apparatus according to the present invention.

FIG. 5 is a whole block diagram showing an incineration ash treatment apparatus according to the second embodiment of the present invention.

DETAILED DESCRIPTION

Next, embodiments of the present invention will be explained with reference to drawings in detail. Here, incineration ash is ashes generated by incinerating combustible materials such as municipal waste in incinerators such as a stoker type incinerator and a fluidized bed type incinerator, and the ash includes main ash (bottom ash) remaining on the bottom of an incinerator and fly ash included in exhaust gas from an incinerator.

FIG. 1 shows an incineration ash treatment apparatus according to the first embodiment of the present invention, and the treatment apparatus 1 includes a dryer 2 for drying a received incineration ash A1, a first magnetic separator 3 for magnetically sorting a dried ash A2 discharged from the dryer 2, a crusher 4 for crushing a nonmagnetic material N1 discharged from the first magnetic separator 3, a second magnetic separator 7 for magnetically sorting a crushed material C discharged from the crusher 4, an eddy current separator 8 for sorting, with eddy current, a nonmagnetic material N2 discharged from the second magnetic separator 7, a pneumatic separator 9 for sorting, by wind, a conductor E discharged from the eddy current separator 8, an air table 10 for performing specific gravity sorting of a heavy material H1 discharged from the pneumatic separator 9, and so on.

The dryer 2 is mounted to dry the incineration ash A1. As the dryer 2 is preferably used a rotary kiln type hot air dryer capable of continuously treating the incineration ash A1. In addition, as heat source for drying the incineration ash A1 by the dryer 2 can be used heat generated in a cement burning apparatus, for example, waste heat of a cement kiln such as a cement kiln exhaust gas can be used. Drying the incineration ash A1 to preferably be less or equal to 20% in water content can prevent pelletization of treated object in processes at the post stage of the dryer 2, and realize efficient treatment in each process.

The first magnetic separator 3 is mounted to remove a magnetic material M1 including iron and others from a dried ash A2. As the first magnetic separator 3, for example, can be used a drum type magnetic separator, a hanging type magnetic separator or the like.

The crusher 4 is mounted to crush the nonmagnetic material N1 from the first magnetic separator 3 to any particle diameter less or equal to 5 mm. Crushing the nonmagnetic material N1 allows noble metal concentrated particles to be scraped from surfaces of noble metal adhered particles included in the nonmagnetic material N1. In addition, in the present invention, "particles whose diameters are less or equal to Amm" means passing portion when using a sieve whose mesh size is Amm is used. But, in case of a device that cannot perform strict particle distribution, "particles whose diameters are less or equal to Amm" means passing portion and another portion remaining on a sieve whose weight is less or equal to 10 percent of that of the passing portion when using a sieve whose mesh size is Amm is used.

A cyclone 5 is mounted to collect dust generated by crushing the nonmagnetic material N1 by the crusher 4 from an exhaust gas G1 as dust D1. In addition, a bag filter 6 is mounted to collect dust from an exhaust gas G2 of the cyclone 5, by the bag filter 6 is collected a dust D2 that cannot be collected by the cyclone 5.

Further, the second magnetic separator 7 is mounted to remove the magnetic material M2 including iron and others from the crushed material C. As the second magnetic separator 7, for example, a drum type magnetic separator, a hanging type magnetic separator or the like can be used.

The eddy current separator 8 is mounted to sort the nonmagnetic material N2 from the second magnetic separator 7 into the conductor E and the nonconductor I by electromagnetic induction. The eddy current separator 8 can be a rotating magnet type, and for example, as shown in FIG. 2, the rotating magnet type eddy current separator 8 can be provided with a columnar magnet 8a including north poles and south poles alternatively mounted in a circumferential direction of a column side surface, a drum 8b for accommodating the magnet 8a, a belt conveyor (moving belt) 8c wound on the drum 8b and transporting the nonmagnetic material N2, a board-shaped separator 8d for separating the nonmagnetic material N2 into the conductor E and the nonconductor I.

It is preferable that rotation speed of the drum 8b of the eddy current separator 8 is more or equal to 4000 rpm. With this, noble metals and metal aluminum can be efficiently recovered from the nonmagnetic material N2 on the conductor E side. Particularly, when particle diameter of the nonmagnetic material N2 is less or equal to 5 mm, setting the rotation speed of the drum 8b to be more or equal to 4000 rpm can remarkably improve recovery ratio as comparted to the case that the rotation speed is less than 4000 rpm.

As shown in FIG. 1, the pneumatic separator 9 is mounted to sort the conductor E discharged from the eddy current separator 8 by wind force into the heavy material H1 and the light material L1. Although the pneumatic separator 9 can be omitted, with the pneumatic separator 9, noble metals can be sorted and recovered more efficiently.

The air table 10 is mounted to sort the heavy material H1 discharged from the pneumatic separator 9 by specific gravity sorting into the high gravity material H2 and the low gravity material L2. The air table 10 is, as shown in FIG. 3, provided with a vibratory table 10a with a predetermined inclination angle and a plurality of small vent holes for air flow, a blow-up blower 10b for feeding air from the lower surface of the vibratory table 10a to the upper surface thereof, and so on.

The heavy material H1 fed on the upper surface of the vibratory table 10a levitates from the upper surface by air flows passing through the vibratory table 10a, and vibration added in the inclined direction of the vibratory table 10a causes the high gravity material H2 to move toward the lower layer and the low gravity material L2 to move toward the upper layer. The high gravity material H2 in the lower layer receives frictional force and vibration force from the upper surface of the vibratory table 10a and moves obliquely upward, the low gravity material L2 in the upper layer moves obliquely downward without frictional force and vibration force from the upper surface of the vibratory table 10a, so that the high gravity material H2 and the low gravity material L2 are separately discharged from the vibratory table 10a. In addition, instead of the air table 10, other specific gravity separator can be used, and it is not limited to one of dry type and wet type.

Next, motion of the incineration ash treatment apparatus 1 with the above construction will be explained mainly with reference to FIG. 1.

The received incineration ash A1 is fed to the dryer 2 and is dried until water content thereof becomes less or equal to approximately 20%. Next, the dried ash A2 discharged from the dryer 2 is sorted by magnetic force into the magnetic material M1 and the nonmagnetic material N1 in the first magnetic separator 3. Then, the nonmagnetic material N1 discharged from the first magnetic separator 3 is crushed by the crusher 4. Further, a dust is collected from the exhaust gas G1 from the crusher 4 by the cyclone 5, a dust is collected from the exhaust gas G2 from the cyclone 5 by the bag filter 6, and the dusts D1, D2 are recovered by the cyclone 5 and the bag filter 6 respectively.

The crushed material C discharged from the crusher 4 is sorted by magnetic force into the magnetic material M2 and the nonmagnetic material N2 in the second magnetic separator 7, and the nonmagnetic material N2 discharged from the second magnetic separator 7 is sorted by eddy current into the conductor E including much noble metals and metal aluminum, and the nonconductor I in the eddy current separator 8.

Next, after the conductor E discharged from the eddy current separator 8 is fed to the pneumatic separator 9 to be sorted into the heavy material H1 including noble metals and aluminum and the light material L1 including small amounts of noble metals and metal aluminum, the heavy material H1 discharged from the pneumatic separator 9 is fed to the air table 10 to be sorted into the high gravity material H2 including high purity noble metals and the low gravity material L2 including high purity aluminum. At this time, a dust is collected from an exhaust gas G3 discharged from the air table 10 by the cyclone 11, a dust is collected from an exhaust gas G4 of the cyclone 11 by the bag filter 12, and the dusts D3, D4 are recovered in the cyclone 11 and the bag filter 12 respectively.

As described above, an ash generated by removing noble metals and metal aluminum from the nonmagnetic material N2 can be recovered as the nonconductor I by the eddy current separator 8, and high purity noble metals can be recovered as the high gravity material H2 by the air table 10, and so on.

In addition, the materials recovered by the above treatment apparatus 1 are effectively used. For example, the magnetic material M1 and the magnetic material M2 removed by the first magnetic separator 3 and the second magnetic separator 7 include much iron, so that they can be used as iron of raw material for iron manufacture and cement raw material and the like. Further, the dusts D1, D2 recovered by the cyclone 5 and the bag filter 6 respectively can be used as cement raw materials and the like.

Further, the nonconductor I discharged from the eddy current separator 8 and the light material L1 discharged from the pneumatic separator 9 include little noble metals and metal aluminum also, so that they are used as cement raw materials and the like.

In addition, although illustration is omitted, it is possible to further improve purity of noble metal by removing iron and others by magnetic sorting from the high gravity material H2 discharged from the air table 10.

Further, the dusts D3, D4 recovered by the cyclone 11 and the bag filter 12 respectively include much metal aluminum, so that the dusts D3, D4 can be used as recycle raw material for metal aluminum and cement raw material in accordance with compositions thereof.

In addition, in the above embodiment, although the crushed material C by the crusher 4 is fed to the second magnetic separator 7, a classifier such as a sieve can be mounted instead of the crusher 4 to feed particles whose particle diameters are in a predetermined size less or equal to 5 mm to the second magnetic separator 7. In this case, particles whose diameters are more than the predetermined size may be discharged outside the system as cement raw material and the like, or may be crushed such that the particle diameters thereof become less or equal to the predetermined size.

Further, in the above embodiment, although the crushed material C by the crusher 4 is fed to the second magnetic separator 7, a classifier such as a sieve for classifying the crushed material C may be mounted, and the crushed material C can be classified by the classifier to adjust particle diameter of the crushed material C in the predetermined range less or equal to 5 mm.

In addition, a particle group whose particle diameter is less or equal to a predetermined size less or equal to 5 mm is further subdivided, and subdivided particle groups can be separately fed to the second magnetic separator 7 to improve recovery accuracy. For example, the crushed material C discharged from the crusher 4 is fed to the first sieve to be separated into a particle group whose particle diameter is more or equal to 5 mm and a particle group whose particle diameter is less than 5 mm. Next, the particle group whose particle diameter is less than 5 mm obtained by the first sieve is fed to the second sieve to be separated into a particle group whose particle diameter is more or equal to 3 mm and less than 5 mm, and a particle group whose particle diameter is less than 3 mm. Further, the particle group whose particle diameter is less than 3 mm obtained by the second sieve is fed to the third sieve to be separated into a particle group whose particle diameter is more or equal to 2 mm and less than 3 mm, and a particle group whose particle diameter is less than 2 mm. In addition, the particle group whose particle diameter is less than 2 mm obtained by the third sieve is fed to the fourth sieve to be separated into a particle group whose particle diameter is more or equal to 1 mm and less than 2 mm, and a particle group whose particle diameter is less than 1 mm. Then, the particle group whose particle diameter is more or equal to 5 mm, the particle group whose particle diameter is more or equal to 3 mm and less than 5 mm, the particle group whose particle diameter is more or equal to 2 mm and less than 3 mm, the particle group whose particle diameter is more or equal to 1 mm and less than 2 mm and the particle group whose particle diameter is less than 1 mm are separately fed to the second magnetic separator 7 to be separately treated.

With the treatment, noble metals and metal aluminum can be recovered on the conductor E side from the nonmagnetic material N2 by the eddy current separator 8 more effectively. In addition, noble metals included in the heavy material H1 can be recovered on the high gravity material H2 side by the air table 10 further effectively. In addition, the above classification point can be properly adjusted in a range less or equal to 5 mm.

In addition, although the pneumatic separator 9 is mounted between the eddy current separator 8 and the air table 10, it is not necessarily mount the pneumatic separator 9, and the conductor E discharged from the eddy current separator 8 can directly be introduced to the air table 10. Further, depending on water content and other physical properties of the received incineration ash A1, devices other than the eddy current separator 8, a specific gravity separator such as the air table 10 exemplified can appropriately be omitted.

Next, an exemplary test for the incineration ash treatment apparatus according to the first embodiment of the present invention will be explained with reference to FIG. 4.

FIG. 4 shows an apparatus for the exemplary test, and the treatment apparatus 21 is provided with a dryer 22 for drying an incineration ash (municipal waste incineration ash) A1, the first magnetic separator 23 for sorting by magnetic force a dried ash A2 discharged from the dryer 22, a sieve 24 for classifying a nonmagnetic material N1 discharged from the first magnetic separator 23, a second magnetic separator 25 for sorting by magnetic force of fine particles P discharged from the sieve 24, an eddy current separator 26 for sorting by eddy current a nonmagnetic material N2 sorted by the second magnetic separator 25, an air table 27 for sorting through difference in specific gravity a conductor E discharged from the eddy current separator 26, and so on.

The incineration ash A1 is fed to the dryer 22 whose internal temperature is 105° C. and is dried until water content thereof becomes 0% (absolutely dried condition). Next, the dried incineration ash A1 is fed to the first hanging type magnetic separator 23 to remove a magnetic material M1 therefrom, and the obtained nonmagnetic material N1 is fed to the sieve 24 to be classified, and the fine particles P whose particle diameters are less or equal to 5 mm that pass through the sieve 24 are recovered. Further, the fine particles P are caused to pass through the second magnetic separator 25 to remove the magnetic material M2, and the nonmagnetic material N2 is recovered. The nonmagnetic material N2 is fed to an eddy current separator (TVIS-Type made by SGM MAGNETICS) 26 with a drum whose rotation speed is 6000 rpm so as to be divided into the conductor E and the nonconductor I. Further, the conductor E is sorted through difference in specific gravity by an air table (made by TRIPLE/S DYNAMICS, INC. (USA)) 27 to be the high gravity material H and the low gravity material L.

Components of the fine particles P, the conductor E, the nonconductor I, the high gravity material H and the low gravity material L obtained as described above were analyzed. In these components, gold and silver were analyzed by ICP mass spectrometry, and other components were analyzed by X-ray fluorescence analysis. In the ICP mass spectrometry, an analyzed object was ground less or equal to 100 μm, and was decomposed with acid for quantitative analysis at a lower limit of quantification 0.1 g/l. In addition, in the X-ray fluorescence analysis, an analyzed object was ground less or equal to 100 μm, and was analyzed by semi-quantitative analysis with fundamental parameter method.

In the above test, in content of each component of the conductor E to the fine particles P, gold increased approximately 3.2 times, and silver increased approximately 103 times. Further, copper also increased approximately 19 times. Further, aluminum content increased 4.9 times. From these results, it is found that sorting an incineration ash by eddy current allows noble metals and metal aluminum to efficiently be recovered. On the other hand, aluminum content of the nonconductor I obtained by eddy current sorting decreased to approximately 86% of the fine particles P.

Further, in content of each component of the high gravity material H to the conductor E, gold increased approximately 100 times, and silver increased approximately 2.1 times, and copper increased approximately 2.5 times. From these results, it is found that specific gravity sorting of the conductor E, which is obtained by sorting an incineration ash by eddy current, allows the high gravity material H containing much noble metals to efficiently be recovered from the conductor E. In addition, iron contents of the fine particles P, the conductor E, the nonconductor I, the high gravity material H and the low gravity material L are almost the same.

In addition, in the above test, when rotation speed of the drum is set to be 3500 rpm, the conductor E was not recovered at all. Therefore, rotation speed of the drum of the eddy current separator is preferably set to be more or equal to approximately 4000 rpm.

Next, an incineration ash treatment apparatus according to the second embodiment of the present invention will be explained. The treatment apparatus mixes a reformer to an incineration ash to prevent pelletization of the incineration ash caused by water contained therein.

For example, incineration ash of municipal waste is wet ash with moisture, and there are cases where water content of the incineration ash is high, that is, 15% to 35%. The wet ash may be pelletized and become large due to vibrations in the incineration ash treatment apparatus and drops during movements between devices composing the treatment apparatus. Then, the incineration ash treatment apparatus may be clogged by the coarsened incineration ash, and it becomes difficult to sort the coarsened incineration ash based on predetermined particle size and difference in specific gravity, which may cause reduction in sorting efficiency.

Therefore, in the above incineration ash treatment apparatus 1 according to the first embodiment, the dryer 2 is used to dry the incineration ash to prevent generation of the above problems. But, it is preferable from the aspects of saving energy and cost reduction that the problems are resolved without using the dryer 2.

Then, in an incineration ash treatment apparatus according to the second embodiment, the dryer 2 is omitted and in place of the dryer 2, constructions for mixing a reformer for preventing pelletization of the incineration ash are added.

FIG. 5 is a whole block diagram of an incineration ash treatment apparatus according to the second embodiment the present invention. The incineration ash treatment apparatus 31 according to the second embodiment is provided with a first sieve 32, a first crusher 33, a first magnetic separator 34, a second sieve 35, a mixer 36, a second magnetic separator 37, a second crusher 38, a cyclone 39, a bag filter 40, a third magnetic separator 41, an eddy current separator 42, a pneumatic separator 43, an air table 44, a cyclone 45 and a bag filter 46. These devices can appropriately be omitted in accordance with property of the incineration ash A, amount and property of a mixed reformer and the like.

In the devices constituting the incineration ash treatment apparatus 31, the second magnetic separator 37, the second crusher 38, the cyclone 39, the bag filter 40, the third magnetic separator 41, the eddy current separator 42, the pneumatic separator 43, the air table 44, the cyclone 45 and the bag filter 46 are the same as the first magnetic separator 3, the crusher 4, the cyclone 5, the bag filter 6, the second magnetic separator 7, the eddy current separator 8, the pneumatic separator 9, the air table 10, the cyclone 11 and the bag filter 12 of the incineration ash treatment apparatus 1 according to the first embodiment, so that detailed explanations thereof are omitted.

The first sieve 32 is a separator for particles by a sieve through which particles P1 whose particle diameters are less than Xmm (a predetermined particle diameter selected from more or equal to 15 mm and less than 40 mm, the same shall apply hereinafter). The particles passing through the first sieve 32 in the incineration ash A fed to the first sieve 32 are supplied to the mixer 36 described below. On the other hand, particles P2 that do not pass the first sieve 32, whose particle diameters are more or equal to Xmm, are supplied to the first crusher 33. The reason why the particle diameter Xmm is selected between 15 mm and 40 mm is when the particle diameter Xmm is set to be less than 15 mm sieve openings are easily clogged in case of high water content incineration ash A, and when the particle diameter Xmm is set to be more or equal to 40 mm cakes are mixed in the mixer 36, so that load of the mixer 36 becomes large, and, particles whose diameters are more or equal to 40 mm are not much, and amount of the incineration ash A treated between the first crusher 33 and the second sieve 35 becomes small, resulting in inefficient treatment.

The first crusher 33 is mounted to crush the particles P2 fed from the first sieve 32 whose particle diameters are more or equal to Xmm to any particle diameter less than Xmm. Crushed material C1 by the first crusher 33 is supplied to the first magnetic separator 34.

The first magnetic separator 34 is mounted to remove a magnetic material M1 including iron and others in the crushed material C1. As the first magnetic separator 34 can be used, for example, a drum type magnetic separator, a hanging type magnetic separator and so on. The nonmagnetic material N1 sorted by the first magnetic separator 34 is fed to the second sieve 35. Removing the magnetic material M1 from the crushed material C1 by the first magnetic separator 34 allows reforming effect of the incineration ash A by the reformer to be enhanced.

The second sieve 35 is, like the first sieve 32, a separator for sorting particles by using a sieve through which particles P3 whose particle diameters are less than Xmm pass. The particles P3, which pass through the second sieve 35, whose particle diameters are less than Xmm are fed to the mixer 36. On the other hand, particles P4, which do not pass through the second sieve 35, whose particle diameters are more or equal to Xmm are discharged out of the system. It is possible to feed the particles P4 to the first crusher 33 without discharging out of the system.

The mixer 36 is a mixer to which the particles P1 and P3, which are fed from the first sieve 32 and the second sieve 35, whose particle diameters are less than Xmm and a reformer RA are thrown, and they are mixed therein.

The reformer RA is mixed to the incineration ash, which is a wet ash, to prevent pelletization thereof, and enters between particles of the incineration ash to prevent pelletization of the particles with each other. In addition, in order to effectively utilize a remaining ash after noble metals and others are recovered as a cement raw material or the like, it is necessary that the reformer RA is a material that can be used as a cement raw material or the like. To utilized the ash as a cement raw material, as the reformer RA are used incineration fly ash of municipal waste, coal fly ash, limestone powder, ground sand and others. Further, as the reformer RA, the light material L1, which is sorted by the pneumatic separator 43 shown in FIG. 5, can be used. The light material L1 includes little coarse particle and water, which preferably prevents the pelletization. One of these reformers RA may be used alone, or more or equal to two kinds of them can be used by mixture.

Particle diameter of the reformer RA is less or equal to 0.1 mm. When particle diameter of the reformer RA exceeds 0.1 mm, sufficient effect for preventing the pelletization cannot be obtained.

Mixing ratio of the reformer RA is more or equal to 15 pts.mass and less or equal to 50 pts.mass to 100 pts.mass of the incineration ash A, preferably more or equal to 25 pts.mass and less or equal to 45 pts.mass. When the mixing ratio of the reformer RA is less than 25 pts.mass, effect of preventing pelletization is insufficient. On the other hand, the mixing ratio exceeds 45 pts.mass, effect of preventing pelletization improves gradually, when it exceeds 50 pts.mass, effect of preventing pelletization saturates, which reduces grade of metals also.

The mixture MA, which is generated by mixing the particles P1 and P3 and the reformer RA in the mixer 36, is fed to the second magnetic separator 37. Treatments after the second magnetic separator 37 are the same as those of the incineration ash treatment apparatus 1 according to the first embodiment described above, and noble metals and others are recovered.

With the incineration ash treatment apparatus 31 with the above construction, noble metals and others can efficiently be recovered from incineration ash, and remaining ash can effectively be utilized. In addition, it is possible to efficiently prevent pelletization of the incineration ash, clogging in the incineration ash treatment apparatus 31 and reduction in sorting efficiency.

In addition, the first sieve 32, the first crusher 33, the first magnetic separator 34 and the second sieve 35 are mounted to improve reforming efficiency by reformers, but they are not essential in the present invention. Then, they can be omitted depending on the situation, for example, when particle diameter of the incineration ash A thrown in the incineration ash treatment apparatus 31 is initially less than Xmm, much amount of reformer RA is added, and so on.

Next, an exemplary experiment on prevention of pelletization of incineration ash by the reformer RA will be explained.

Table 1 shows results of the experiment, for three kinds of incineration ashes A-C, on relations between water content and operation condition from the first sieve 32 to the air table 44 for treatment shown in FIG. 5. The incineration ashes A-C are main ashes of municipal waste incineration ashes that generated in stoker furnaces and passed through sieves with 25 mm openings.

TABLE 1

| | WATER CONTENT (%) | OPERATION CONDITION |
|---|---|---|
| INCINERATION ASH A | 29 (UNDRIED) | IMPOSSIBLE |
| | 24 | IMPOSSIBLE |
| | 20 | POSSIBLE |
| | 11 | EASY |
| | 0 | EASY |
| INCINERATION ASH B | 22 (UNDRIED) | POSSIBLE |
| | 17 | EASY |
| INCINERATION ASH C | 18 (UNDRIED) | EASY |

As for the incineration ash A, when water content thereof was more or equal to 24%, clogging generated before the second crusher 38, and operation could not continue. When water content of the incineration ash A was 20%, and that of the incineration ash B was 22%, operation could continue, but some pelletization generated, which reduced metal grade of recovered material. When water content of the incineration ash A was lower or equal to 11%, that of the incineration ash B was 17%, and that of the incineration ash C is 18%, no pelletization generated. From the results, it is found that as water content of the incineration ash increases, pelletization generate more easily, and when the water content exceeds approximately 20%, there are case when operation cannot continue.

Next, in the incineration ashes A-C, the incineration ash A of 29% water content, the incineration ash B of 22% water content and the incineration ash C of 18% water content are separately mixed and agitated in a mixer to simulate pelletization.

1000 g of each incineration ash was put in a 20 liter of container ((185 mm in diameter, 386 mm in height), and a power mixer (made by RYOBI LIMITED (Type:PM-311)) rotated at 300 rpm to agitate each mixture for one minute.

Next, the incineration ashes A-C were sorted using sieves with 1 mm, 2 mm, 5 mm and 10 mm openings. The sorting was manually performed in conformity to JIS A 1102 while vertically and horizontally moving the sieves to shake the samples. Then, mass ratio of particles whose particle diameters are less than 1 mm, 1 mm or more and less than 2 mm, 2 mm or more and less than 5 mm, 5 mm or more and less than 10 mm, 10 mm or more was measured. The results are shown in Table 2. In addition, in JIS A 1102:2014 "Method of test for sieve analysis of aggregates", sieves with nominal openings of 1.18 mm, 2.36 mm, 4.75 mm, 9.5 mm, 26.5 mm can be referred to 1 mm, 2 mm, 5 mm, 10 mm and 25 mm sieves respectively, and size of openings of the sieves used in the present experiment is set in accordance with the above test method.

TABLE 2

| | WATER CONTENT (%) | PARTICLE SIZE DISTRIBUTION (%) | | |
|---|---|---|---|---|
| | | <2 mm | 2-5 mm | 5 mm< |
| INCINERATION ASH A | 29 | 1 | 10 | 89 |
| INCINERATION ASH B | 22 | 9 | 52 | 39 |
| INCINERATION ASH C | 18 | 15 | 66 | 19 |

As shown in Table 2, in simulation on pelletization, it is found, from the result of the incineration ash B with 22% of water content, when particles whose diameters exceed 5 mm exist 39% or less, operation can continue. In addition, more preferably, it is found, from the result of the incineration ash C with 18% of water content, when particles whose diameters exceed 5 mm exist 19% or less, operation can continue with ease.

Next, particle diameters and components of the reformers used for the experiment are shown in Table 3.

TABLE 3

| REFORMER | DETAIL | PARTICLE DIAMETER | COMPONENT (%) | | | |
|---|---|---|---|---|---|---|
| | | | $SiO_2$ | $Al_2O_3$ | $Fe_2O_3$ | CaO |
| FLY ASH A | MUNICIPAL WASTE INCINERATION FLY ASH (STOKER FURNACE) | <0.1 mm | 6 | 3 | 1 | 40 |
| FLY ASH B | MUNICIPAL WASTE INCINERATION FLY ASH (FLUID BED FURNACE) | <0.1 mm | 15 | 8 | 5 | 31 |
| FLY ASH C | COAL ASH | <0.1 mm | 55 | 27 | 5 | 3 |
| LIMESTONE FILLER | CEMENT RAW MATERIAL | <0.1 mm | <1 | <1 | <1 | 99 |
| SAND | STANDARD SAND FOR CEMENT STRENGTH TEST | <2 mm | 98 | <1 | <1 | <1 |
| GROUND SAND | STANDARD SAND FOR CEMENT STRENGTH TEST | <0.1 mm | 98 | <1 | <1 | <1 |

As the reformers were used a fly ash A, which was a municipal waste incineration fly ash generated in a stoker furnace and particle diameter of which was less than 0.1 mm, a fly ash B, which was a municipal waste incineration fly ash generated in a fluidized bed furnace and particle diameter of which was less than 0.1 mm, a fly ash C, which was a coal ash and particle diameter of which was less than 0.1 mm, a cement raw material, which was a limestone powder and particle diameter of which was less than 0.1 mm, a sand, which was a standard sand for cement strength test (JIS R 5201) and particle diameter of which was less than 2 mm, and a ground sand, which was obtained by grinding the above standard sand and particle diameter of which was less than 0.1 mm.

Next, using the reformers shown in Table 3, a verification test was carried out to confirm effects of preventing pelletization with the reformers. In this connection, incineration ashes and predetermined amount of reformers were mixed and agitated in the same manner as described above.

TABLE 4

| | ASH | | REFORMER | | | MIXTURE | | | | |
|---|---|---|---|---|---|---|---|---|---|---|
| KIND | WATER CONTENT (%) | MIXING AMOUNT (g) | KIND | MIXING AMOUNT (g) | MIXING RATIO (%) | WATER CONTENT (%) | PARTICLE SIZE DISTRIBUTION (%) | | | JUDGE-MENT |
| | | | | | | | <2 mm | 2-5 mm | 5 mm< | |
| INCIN-ERATION ASH A | 29 | 1000 | FLY ASH A | 52 | 5 | 14 | 1 | 14 | 85 | x |
| | | 1000 | | 110 | 10 | 13 | 10 | 50 | 40 | x |
| | | 1000 | | 176 | 15 | 12 | 14 | 49 | 37 | o |
| | | 1000 | | 250 | 20 | 12 | 41 | 29 | 30 | o |
| | | 1000 | | 334 | 25 | 11 | 45 | 27 | 28 | o |
| | | 1000 | | 428 | 30 | 10 | 52 | 27 | 21 | o |
| | | 1000 | FLY ASH B | 176 | 15 | 12 | 38 | 25 | 37 | o |
| | | 1000 | | 250 | 20 | 12 | 47 | 26 | 27 | o |
| | | 1000 | | 428 | 30 | 10 | 57 | 22 | 21 | o |
| | | 1000 | FLY ASH C | 250 | 20 | 12 | 39 | 36 | 25 | o |
| | | 1000 | | 428 | 30 | 10 | 40 | 27 | 33 | o |
| | | 1000 | LIMESTONE FILLER | 250 | 20 | 12 | 38 | 28 | 34 | o |
| | | 1000 | | 428 | 30 | 10 | 49 | 24 | 27 | o |
| | | 1000 | SAND | 250 | 20 | 12 | 2 | 35 | 63 | x |
| | | 1000 | | 428 | 30 | 10 | 34 | 34 | 32 | o |
| | | 1000 | GROUND SAND | 250 | 20 | 12 | 29 | 34 | 37 | o |
| | | 1000 | | 428 | 30 | 10 | 49 | 27 | 24 | o |
| INCIN-ERATION ASH B | 22 | 1000 | FLY ASH A | 250 | 20 | 9 | 53 | 22 | 25 | o |
| INCIN-ERATION ASH C | 18 | 1000 | FLY ASH A | 250 | 20 | 7 | 66 | 20 | 14 | o |

Concretely, the incineration ashes A to which 15% or more of the fly ash A is mixed, to which 15% or more of the fly ash B is mixed, to which 20% or more of the fly ash C is mixed, to which 20% or more of the limestone powder is mixed and to which 20% or more of the ground sand is mixed were judged to be operable. Here, water content of any mixture was 12% or lower.

From the results, it is found when the incineration fly ash of the municipal waste is used as the former, mixing it 15% or more to the incineration ash to reduce water content of the mixture 12% or less can prevent pelletization of the incineration ash. In addition, it is found when the coal fly ash is used as the reformer, mixing it 20% or more to the incineration ash to reduce water content of the mixture 12% or less can prevent pelletization of the incineration ash. Further, it is found when the ground sand is used as the reformer, mixing it 20% or more to the incineration ash to reduce water content of the mixture 12% or less can prevent pelletization of the incineration ash and efficiently recover noble metals from the incineration ash.

DESCRIPTION OF THE REFERENCE NUMERALS

1 incineration ash treatment apparatus
2 dryer
3 first magnetic separator
4 crusher
5 cyclone
6 bag filter
7 second magnetic separator
8 eddy current separator
8a magnet
8b drum
8c belt conveyor
8d separator
9 pneumatic separator
10 air table
10a vibratory table
10b blow-up blower
11 cyclone
12 bag filter
21 incineration ash treatment apparatus
22 dryer
23 first magnetic separator
24 sieve
25 second magnetic separator
26 eddy current separator
27 air table
31 incineration ash treatment apparatus
32 first sieve
33 first crusher
34 first magnetic separator
35 second sieve
36 mixer
37 second magnetic separator
38 second crusher
39 cyclone
40 bag filter
41 third magnetic separator
42 eddy current separator
43 pneumatic separator
44 air table
45 cyclone
46 bag filter
A, A1 incineration ashes
A2 dried ash
C crushed material
C1 crushed material
D1-D4 dusts
E conductor
G1-G4 exhaust gases
H1 heavy material
H, H2 high gravity materials
I nonconductor
L1 light material L, L2 low gravity materials
M-M3 magnetic materials
MA mixture
N-N3 nonmagnetic materials
P, P1, P3 fine particles
P2 coarse particle
R residue
RA reformer

The invention claimed is:

1. An incineration ash treatment method comprising the steps of:
crushing an incineration ash to be less or equal to 5 mm in maximum particle diameter or/and classifying an incineration ash to obtain an incineration ash whose maximum particle diameter is less or equal to 5 mm;
sorting an incineration ash whose maximum particle diameter is less or equal to 5 mm obtained by the crushing or/and classification by eddy current sorting into a conductor and a nonconductor; and
sorting the conductor obtained by the eddy current sorting by:
specific gravity sorting into a high gravity material and a low gravity material; and
wind sorting into a heavy material and a light material before the specific gravity sorting;
mixing a reformer to the incineration ash to prevent palletization thereof before the incineration ash is crushed or/and classified;
wherein the reformer is the light material sorted by the wind sorting.

2. The incineration ash treatment method as claimed in claim 1, wherein the nonconductor is used as a cement raw material.

3. The incineration ash treatment method as claimed in claim 1, wherein the reformer is at least one selected from incineration fly ash of municipal waste, coal fly ash, limestone powder and ground sand.

4. The incineration ash treatment method as claimed in claim 2, further comprising the step of mixing a reformer to the incineration ash to prevent pelletization thereof before the incineration ash is crushed or/and classified.

5. The incineration ash treatment method as claimed in claim 1, wherein the reformer is at least one selected from incineration fly ash of municipal waste, coal fly ash, limestone powder and ground sand.

6. The incineration ash treatment method as claimed in claim 1, wherein amount of the reformer added to the incineration ash is more or equal to 15 pts.mass and less or equal to 50 pts.mass to 100 pts.mass of the incineration ash.

7. An incineration ash treatment method comprising the steps of:
crushing an incineration ash to be less or equal to 5 mm in maximum particle diameter or/and classifying an incineration ash to obtain an incineration ash whose maximum particle diameter is less or equal to 5 mm;
sorting an incineration ash whose maximum particle diameter is less or equal to 5 mm obtained by the crushing or/and classification by eddy current sorting into a conductor and a nonconductor;
sorting the conductor obtained by the eddy current sorting by specific gravity sorting into a high gravity material and a low gravity material; and
mixing a reformer to the incineration ash to prevent pelletization thereof before the incineration ash is crushed or/and classified;
wherein amount of the reformer added to the incineration ash is more or equal to 15 pts.mass and less or equal to 50 pts.mass to 100 pts.mass of the incineration ash.

8. An incineration ash treatment method comprising the steps of:
crushing an incineration ash to be less or equal to 5 mm in maximum particle diameter or/and classifying an incineration ash to obtain an incineration ash whose maximum particle diameter is less or equal to 5 mm;
sorting an incineration ash whose maximum particle diameter is less or equal to 5 mm obtained by the crushing or/and classification by eddy current sorting into a conductor and a nonconductor;
sorting the conductor obtained by the eddy current sorting by specific gravity sorting into a high gravity material and a low gravity material; and
mixing a reformer to the incineration ash to prevent pelletization thereof before the incineration ash is crushed or/and classified;
wherein particle diameter of the reformer is less or equal to 0.1 mm.

9. An incineration ash treatment method comprising the steps of:
crushing an incineration ash to be less or equal to 5 mm in maximum particle diameter or/and classifying an incineration ash to obtain an incineration ash whose maximum particle diameter is less or equal to 5 mm;
sorting an incineration ash whose maximum particle diameter is less or equal to 5 mm obtained by the crushing or/and classification by eddy current sorting into a conductor and a nonconductor; and
sorting the conductor obtained by the eddy current sorting by:
specific gravity sorting into a high gravity material and a low gravity material; and
wind sorting into a heavy material and a light material before the specific gravity sorting;
wherein amount of the reformer added to the incineration ash is more or equal to 15 pts.mass and less or equal to 50 pts.mass to 100 pts.mass of the incineration ash.

* * * * *